United States Patent Office 3,270,360
Patented Sept. 6, 1966

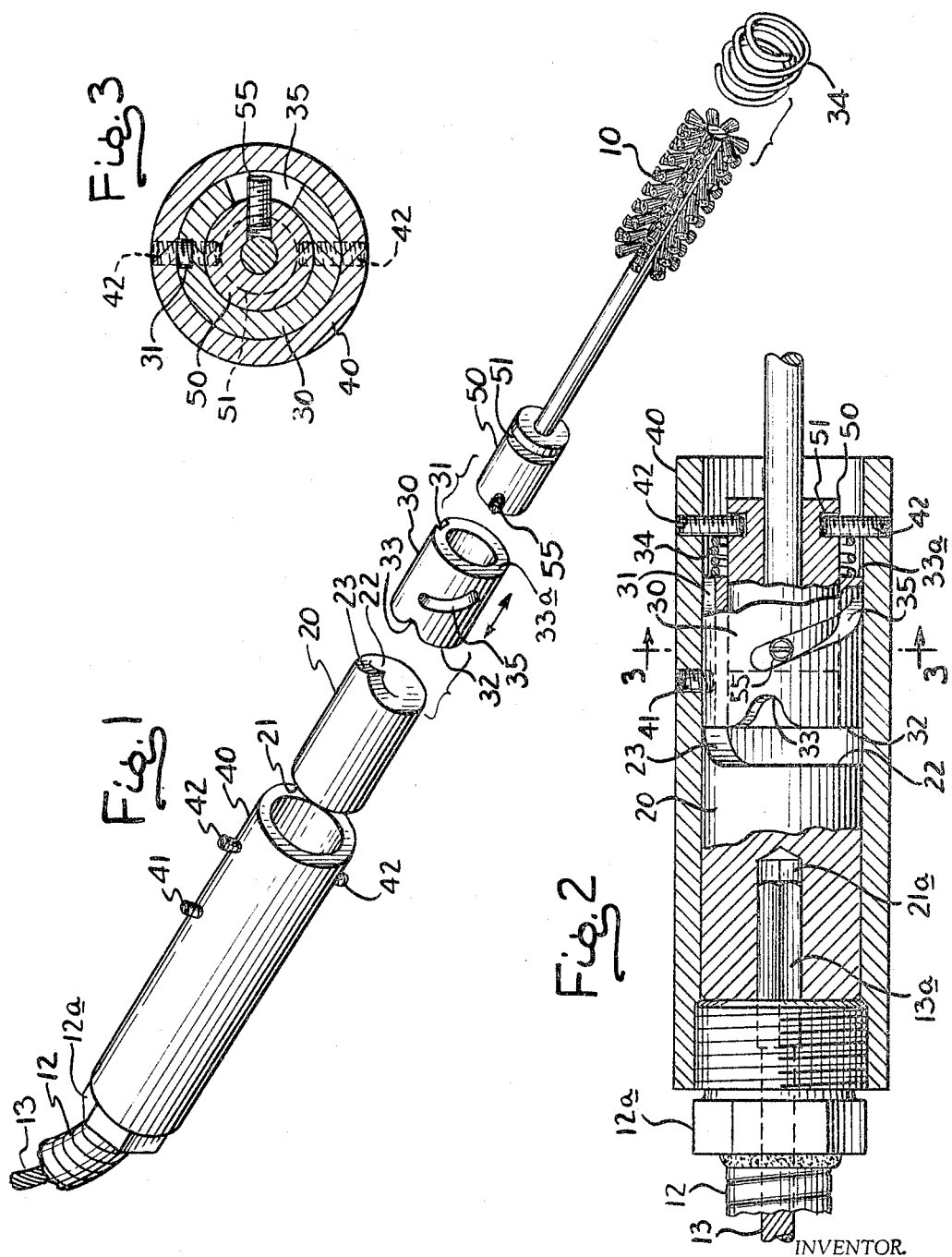

3,70,360
ROTARY OSCILLATORY MOTION FROM
CONTINUOUS ROTARY MOTION
Willis A. Kropp, Stamford, Conn., assignor to General Time Corporation, New York, N.Y., a corporation of Delaware
Filed May 7, 1964, Ser. No. 365,623
7 Claims. (Cl. 15—22)

The present invention relates generally to mechanical transducers and, more particularly, to a mechanical transducer for translating continuous rotary motion into oscillatory rotary motion.

It is a primary object of this invention to provide an improved mechanical transducer for translating continuous rotary motion into oscillatory rotary motion. A related object is to provide such a transducer which is capable of producing a relatively wide range of amplitudes and frequencies of oscillatory rotary motion from any given speed of continuous rotary motion.

It is another object of the invention to provide such a transducer in the form of an integrated mechanical system which is both rugged and compact. In this connection, it is an object to provide such a system which can be completely contained in a small tubular housing. Still another object is to provide such a system which is simple to construct and has a relatively long operating life.

A further object of the invention is to provide an improved mechanical transducer for producing oscillatory rotary motion from a continuous rotary power cable. A related object is to provide such a transducer which can be easily connected to the end of the power cable in a small lightweight tube. Another related object is to provide such a transducer which can be readily manipulated by hand after it has been connected to the power cable.

Still another object of the invention is to provide such a transducer which can be used to drive a variety of operating elements. A more specific object is to provide a transducer for driving a brushing or cleaning element such as a toothbrush. In this connection, it is an object to provide a transducer which permits easy manipulation of the toothbrush within the user's mouth. A still further object is to provide such a transducer having a chuck member which is easily accessible for changing operating elements.

Other objects and advantages of the invention will become apparent upon reading the attached detailed description and appended claims and upon reference to the drawings, in which:

FIG. 1 is an isometric view of the mechanical transducer of this invention and with the transducer exploded to show the various parts thereof;

FIG. 2 is a side elevation view, partially in section, of the transducer of FIG. 1 with all the parts assembled;

FIG. 3 is a sectional end view taken along line 3—3 in FIG. 2.

While the invention will be described in connection with a preferred embodiment, it will be understood that there is no intention to limit the invention to the embodiment shown but, on the contrary, it is intended to cover the various modifications and alternatives included within the spirit and scope of the appended claims.

Turning now to the drawings, there is provided a cylindrical toothbrush 10 which is to be oscillated rotationally about its axis. The source of power is a conventional flexible power cable 12 having a continuously rotating drive element 13 therein. Thus, the continuous rotary motion provided by the drive element 13 must be translated into the oscillatory rotary motion desired in the brush 10.

In the practice of this invention, there is provided a mechanical transducer including a cylindrical cam member 20 having one end 21 connected to the drive element 13 so that the cam member 20 is rotated continuously about its axis. The drive element 13 is provided with an elongated square shaft 13a which extends into a mating square hole 21a in the end of the cam member 20 so as to lock the cam to the rotating drive element. The outside sheath of the flexible cable 12 is rigidly attached to the trandsucer housing by means of a threaded connector 12a secured to the end of the cable sheath, as shown in FIG. 2.

In order to translate the continuous rotary motion of the cam member 20 into oscillatory linear motion, the inner end 22 of the cam is provided with a cam surface 23 which protrudes axially to engage a cam follower 30. The protruding cam surface 23 is located on the periphery of the cam member 20 so that the surface 23 follows a circular path as the member 20 is rotated. The cam follower 30 is in the shape of a cylindrical sleeve having a common axis with the cam member 20, and the engaging surfaces of the cam and cam follower are adapted to oscillate the follower 30 in the axial direction. When the cam member 20 and the follower 30 are assembled, they are placed within a small cylindrical housing 40 (see FIG. 2) which holds the two members firmly in place and yet permits rotational and axial movement of the members.

For the purpose of restraining the cam follower 30 against rotational movement, the outer surface of the follower is provided with an axial keyway 31 which mates with a key 41 threaded through the housing 40. This permits the follower to be moved in an axial direction which preventing it from being moved rotationally. The end 32 of the cam follower which engages the end 22 of the cam member 20 is provided with a notch or recess 33 which mates with the cam surface 23, and a spring 34 is mounted against the other end 33a of the cam follower so as to hold the two ends 22 and 32 in tight engagement.

As the cam member 20 is rotated, the spring 34 forces the follower 30 to the left when the cam surface 23 and the recess 33 are aligned so that the follower end 32 is in full engagement with the cam end 22. Then as the cam surface 23 moves out of alignment with the recess 33, it forces the follower 30 to the right, and the follower remains in this position until the surface 23 comes into alignment with recess 33 again. In other words, the cam surface 23 periodically displaces the cam follower 30 away from the cam member 20 in an axial direction during the continuous rotation of the cam member 20, while the spring 34 moves the cam follower back toward the cam member between the periodic displacements away from the cam member. Of course, the key 41 constantly restrains the follower 30 against any rotational movement. Thus, it can be seen that the continuous rotary motion of the cam member 20 is translated into oscillatory linear motion of the cam follower 30. Since the cam surface 23 and the recess 33 are aligned only once during each revolution, the follower 30 goes through one complete cycle of axial oscillation or reciprocation for each revolution of the cam member 20.

The final element of the transducer assembly as a small cylindrical chuck 50 which is journalled within the hollow cam follower 30 at one end and receives the brush 10 at the other end. The outer surface of the chuck 50 is provided with a circumferential keyway 51 which mates with a pair of diametrically opposed keys 42 threaded through the housing 40 so as to prevent axial movement of the chuck. The keys 42 also serve to hold the spring 34 in place within the housing 40. In order to translate the axial oscillation of the follower 30 into rotational oscillation of the chuck 50, the follower 30 is provided with a curved slot 35 extending both circumferentially and axially through a small portion of the follower. After the chuck 50 has been placed within the follower, but before the follower is placed within the housing 40, a pin 55 is inserted through the slot 35 and threaded into the chuck, thereby keying the chuck 50 to the follower 30 (see FIG. 3). Since the chuck 50 is restrained against axial movement by the key 42 and the follower 30 is restrained against rotational movement, it can be seen that the force exerted on the pin 55 by the axial oscillation of the follower 30 will cause the chuck 50 to oscillate rotationally. This in turn, causes the brush 10 secured to the chuck 50 to oscillate rotationally about its axis. Of course, the pin 55 and slot 35 must be located such that the keyway 51 is always spaced away from the end 33a of the cam follower during its reciprocation so as to provide space for the spring 34.

It will be apparent from the foregoing description that the mechanical transducer of this invention is capable of providing a wide range of amplitudes and frequencies of oscillatory rotary motion from any given speed of continuous rotary motion. Thus, the amplitude of the rotational oscillations can be controlled both by the axial length of the cam surface 23 and by the slope of the slot 35 in the cam follower; that is, the amplitude increases with increasing axial length of the cam surface 23 and with increasing circumferential length of the slot 35. The frequency can be controlled by the number of recesses 33 provided in the end 32 of the cam follower. Although only one such recess has been provided in the follower shown in the drawings, it is obvious that each additional recess will produce an additional cycle of oscillatory motion. Of course, it is usually desirable to have all the recesses equally spaced so as to maintain a constant frequency.

The integrated transducer assembly of this invention is both rugged and compact, and can be completely contained within a small light-weight housing which is easily attachable to the end of a flexible power cable. Thus, the transducer is ideally suited for applications where a small portable operating element, such as a toothbrush, must be manipulated by hand.

Various modifications of the specific form of the invention illustrated and described herein will be readily apparent to those skilled in the art. For example, although the invention has been described with particular reference to a chuck member journalled within the cam follower with an outwardly protruding follower pin, the chuck member could be mounted on the outside of the cam follower with an inwardly protruding follower pin. Similarly, means other than the spring 34 could be provided to move the cam follower 30 toward the continuously rotating cam member between the periodic displacements away from the cam member.

What is claimed is:

1. A mechanical transducer for converting continuous rotary motion to oscillatory rotary motion, in an electric toothbrush, said transducer comprising the combination of a continuous rotary driving mechanism, a cam member connected to said driving mechanism for continuous rotation of said cam member about an axis, a cam follower restrained against rotational movement and adapted to be displaced along said axis and engaging said cam member, said cam member displacing said cam follower linearly along said axis upon continuous rotation of said cam member, and a chuck member restrained against linear movement and having means for engaging said cam follower, the engaging means and said cam follower being adapted to oscillate said chuck member rotationally upon linear oscillation of said cam follower.

2. A mechanical transducer for converting continuous rotary motion to oscillatory rotary motion, in an electric toothbrush, said transducer comprising the combination of a continuous rotary driving mechanism, a cam member connected to said driving mechanism for continuous rotation of said cam member about an axis, a cam follower restrained against rotational movement and adapted to be displaced along said axis, and engaging said cam member, said cam member displacing said cam follower away from said cam member in the direction of said axis during the continuous rotation of said cam member, means for moving said cam follower back toward said cam member between the periodic displacements whereby said cam follower is oscillated axially, and a chuck member restrained against axial movement and having means for engaging the cam follower, said engaging means and said cam follower being adapted to oscillate said chuck member rotationally in synchronism with the axial oscillation of said cam follower.

3. A mechanical transducer for converting continuous rotary motion to oscillatory rotary motion, in an electric toothbrush, said transducer comprising the combination of a continuous rotary driving mechanism, a cam member connected to said driving mechanism for continuous rotation of said cam member, said cam member having a cam surface spaced away from the axis of rotation and protruding in a direction parallel to the axis of rotation, a cam follower restrained against rotational movement and engaging said cam member, said cam follower having at least one recess adapted to mate with said protruding cam surface during a portion of each revolution, and spring means for constantly urging said cam follower toward said cam member, whereby said cam follower is oscillated axially by the continuous rotation of said cam member, and a chuck member restrained against axial movement and having means for engaging said cam follower, the engaging means and said cam follower being adapted to convert the axial oscillation of said cam follower to rotational oscillation of said chuck member.

4. A mechanical transducer for converting continuous rotary motion to oscillatory rotary motion, in an electric toothbrush, said transducer comprising the combination of a continuous rotary driving mechanism, a cylindrical cam member having one end connected to said driving mechanism for continuous rotation of said cam member, a cylindrical cam follower restrained against rotational movement and engaging the other end of said cam member, said cam member and said cam follower being aligned on a common axis so as to periodically displace said cam follower away from said cam member in an axial direction during the continuous rotation of said cam member, spring means for moving said cam follower back toward said cam member between said periodic displacements whereby said cam follower is oscillated back and forth along its axis during the continuous rotation of said cam member, a cylindrical chuck member restrained against axial movement and having means for engaging the cam follower, said chuck member and said cam follower being aligned on a common axis with the engaging means being adapted to oscillate said chuck member rotationally about said axis in synchronism with the axial oscillation of said cam follower, and a single tubular housing encasing said cam member, said cam follower, said spring means, and said chuck member.

5. A mechanical transducer for converting continuous rotary motion to oscillatory motion, in an electric toothbrush, said transducer comprising the combination of a continuous rotary driving member, a cam member connected to said driving mechanism for continuous rotation of said cam member about an axis, a cam follower in the form of a cylindrical sleeve restrained against rotational movement, one end of said follower engaging said cam member so as to periodically displace said cam follower away from said cam member in the direction of said axis during the continuous rotation of said cam member, spring means for moving said cam follower back toward said cam member between said periodic displacements whereby said cam follower is oscillated in an axial direction, said cam follower having a slot extending circumferentially and axially through a portion thereof, a cylindrical chuck member journalled within the other end of said cam follower and restrained against axial movement, said chuck member having a pin extending into said slot whereby said chuck member is oscillated rotationally in synchronism with the axial oscillation of said follower.

6. In an electric toothbrush, the combination comprising a continuous rotary driving mechanism, a cam member connected to said driving mechanism for continuous rotation of said cam member about an axis, a cam follower restrained against rotational movement and adapted to be displaced along said axis, and engaging said cam member, said cam member displacing said cam follower linearly along said axis upon continuous rotation of said cam member, a chuck member aligned with said axis and restrained against linear movement, said chuck member having means for engaging said cam follower, and a toothbrush fixed to said chuck member and aligned with said axis, the engaging means and said cam follower being adapted to oscillate said chuck member and said toothbrush rotationally upon linear oscillation of said cam follower.

7. In an electric toothbrush, the combination comprising a continuous rotary driving mechanism, a cam member connected to said driving mechanism for continuous rotation of said cam member about an axis, a cam follower restrained against rotational movement and adapted to be displaced along said axis and engaging said cam member, said cam member displacing said cam follower away from said cam member in the direction of said axis during the continuous rotation of said cam member, means for moving said cam follower back toward said cam member between the periodic displacements whereby said cam follower is oscillated axially, a chuck member aligned with said axis and restrained against linear movement, said chuck member having means for engaging said cam follower, and a toothbrush fixed to said chuck member and aligned with said axis, the engaging means and said cam follower being adapted to oscillate said chuck member and said toothbrush rotationally upon linear oscillation of said cam follower.

References Cited by the Examiner

UNITED STATES PATENTS

| | | | |
|---|---|---|---|
| 933,718 | 9/1909 | Mahoney. | |
| 1,676,483 | 7/1928 | Duthie | 74—57 X |
| 1,835,837 | 12/1931 | Alles | 15—22 |
| 1,945,616 | 2/1934 | Mastrud | 15—22 X |
| 2,534,943 | 12/1950 | Bergeson | 74—56 |
| 3,171,287 | 3/1965 | Jesse | 74—23 X |

FRED C. MATTERN, JR., *Primary Examiner.*

BROUGHTON G. DURHAM, MILTON KAUFMAN, *Examiners.*

D. H. THIEL, *Assistant Examiner.*